(12) United States Patent
Wang et al.

(10) Patent No.: US 8,698,070 B2
(45) Date of Patent: Apr. 15, 2014

(54) PHASE DETECTOR

(75) Inventors: Yi-Xiang Wang, Fremont, CA (US); Jian Zhang, San Jose, CA (US)

(73) Assignee: Hermes Microvision, Inc., Hsinchu (TW)

( * ) Notice: Subject to any disclaimer, the term of this patent is extended or adjusted under 35 U.S.C. 154(b) by 272 days.

(21) Appl. No.: 13/271,811

(22) Filed: Oct. 12, 2011

(65) Prior Publication Data

US 2013/0094017 A1    Apr. 18, 2013

(51) Int. Cl.
*G01D 5/34* (2006.01)

(52) U.S. Cl.
USPC ............... 250/231.13; 250/214.1; 341/13; 356/616

(58) Field of Classification Search
USPC .......... 250/231.13, 231.14, 231.16–231.18, 250/214.1; 341/11, 13, 31; 356/614, 616, 356/617
See application file for complete search history.

(56) References Cited

U.S. PATENT DOCUMENTS

| | | | | |
|---|---|---|---|---|
| 6,794,637 | B1 * | 9/2004 | Holzapfel et al. | 250/231.13 |
| 6,956,200 | B2 * | 10/2005 | Ohmura et al. | 250/231.16 |
| 7,612,327 | B2 * | 11/2009 | Okada | 250/231.13 |

* cited by examiner

*Primary Examiner* — Kevin Pyo
(74) *Attorney, Agent, or Firm* — Muncy, Geissler, Olds & Lowe, P.C.

(57) ABSTRACT

This invention provides a phase detector with more than two detector units on a printed circuit layer. A detector set includes a pair of detector units or one detector unit, and a detector row includes a plurality of detector sets in one line. The phase detector includes a plurality of detector rows and each row has a detector set in one period, wherein all detector units are interleaved to have the same interval between any two adjacent detector units, which is defined as a pitch and the pitch is equal to one period dividing the detector pair number, which is the half sum of the number of one detector set for all rows.

19 Claims, 11 Drawing Sheets

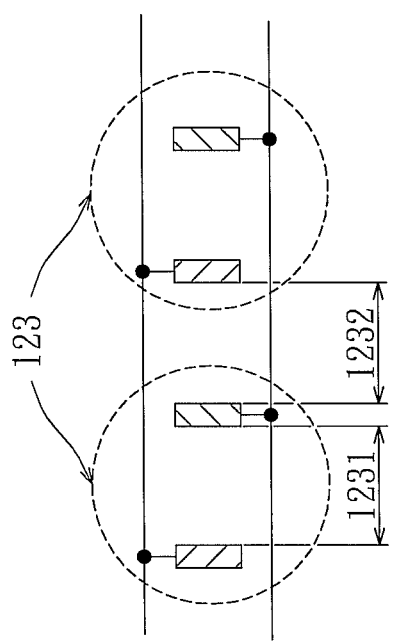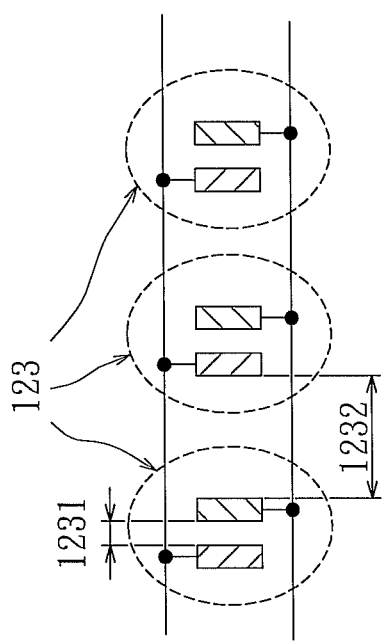

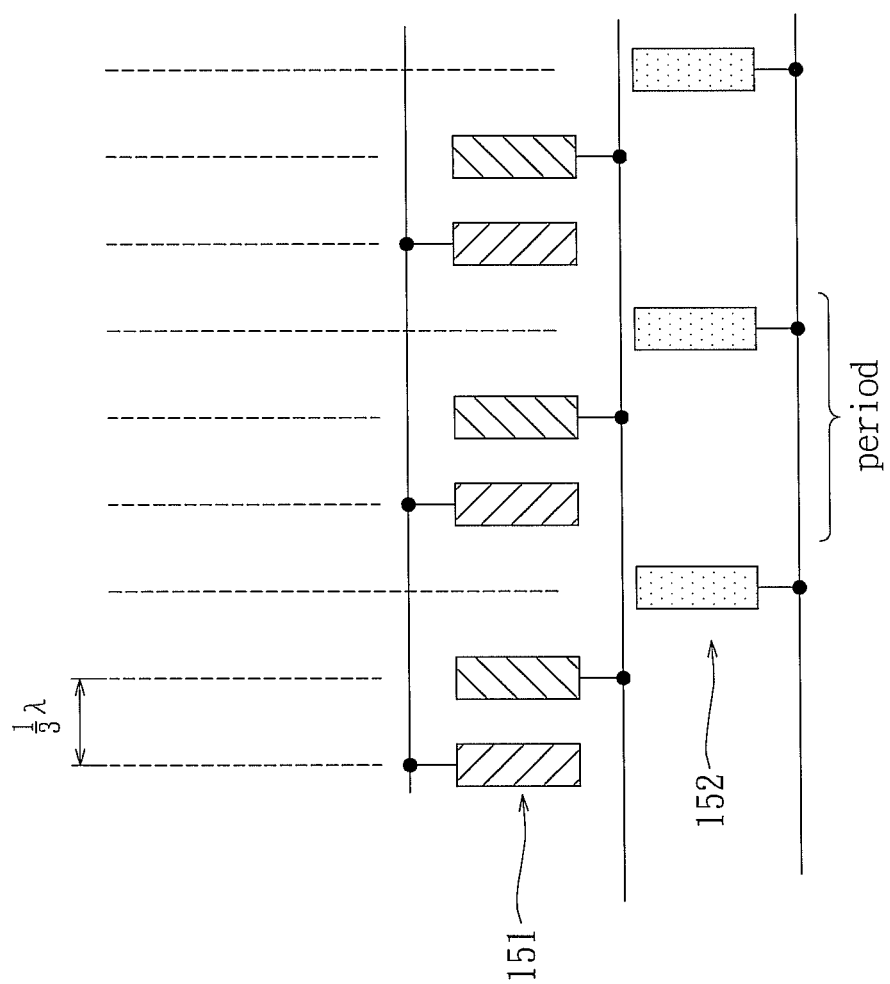

PHASE DETECTOR

FIELD OF THE INVENTION

The present invention relates to a phase detector and particularly to a multiple phase detector.

DESCRIPTION OF THE RELATED ART

The phase detector is usually equipped in a light detector to detect the phase of the incident light. The light source illuminates a target and then is reflected from the target to the light detector and is captured for further analyzing. The intensity of the incident light is usually in a periodic pattern, like a sinusoidal wave. The phase detector includes a plurality of detector units, and those detector units are grouped to a plurality of sets, and those sets are periodically arranged. The detector units in one set are cyclically arranged in one period for detecting the corresponding phase of the incident light. The density of the phase detector units determines the resolution of detecting, where the density is the number of the phase detectors in one period. Each detector has an electron collecting electrode on its top and a lead conduct the electrode to the circuit of the phase detector.

For example, FIG. 1 shows a phase detector with 3 detector units in one period. The detector units 22 are arranged on a substrate 20, usually made by print circuit board (PCB). The detector units are grouped to a plurality of sets, and each set includes three detector units A, B and C and arranged with phase difference $2\pi/3$ (120° in each other. Each detector unit 22 has an electron collecting electrode (not shown) on its top or bottom to connect with the PCB circuit 28 of the phase detector through a lead 26. An insulating diode 24 is arranged between two adjacent detector units as the phase guard for preventing the signal from interfering. As shown as FIG. 1 the lead 26 of the detector unit A is across the conduct line 28 connected with the detector unit C, which is marked as the dotted circle in figure. The cross lines complicates the circuits and usually is arranged in different PCB layers.

FIG. 2A, FIG. 2B and FIG. 2C show the phase detectors with different density of detector units. The sample shown as FIG. 2A includes 2 detector units in one period and the detected phase difference is $\pi$(180°), the sample shown as FIG. 2B includes 3 detector units in one period and the detected phase difference is $2\pi/3$(120°), and the sample shown in FIG. 2C includes 4 detector units in one period and the detected phase difference is $\pi/2$) (90°. The higher density of the detector unit has a higher resolution of detecting, but at the same time the situation of cross lines is more serious and more PCB layers are necessary. For example, the lead is across the conduct line of the PCB circuit in the samples of FIG. 2B and FIG. 2C, so the circuits connected to the detector units are configured on different PCB layers and that incurs the cost.

For increasing the resolution of detecting, the higher density of the detector unit is necessary, but in the meanwhile the cost and complexity of the phase detector are increased. In practice, it is difficult to arrange so many detector units in one period and it is impossible to continuously increase the number of the detector unit.

A new architecture of phase detector is proposed and the proposed phase detector can increase the resolution and reduce the complexity and the cost, and that is described below.

SUMMARY OF THE INVENTION

According to an aspect of this invention, detector units are arranged in a plurality of rows, and those rows are arranged on a PCB in parallel and each row has one top conduct line and one bottom conduct line. As a result, the number of the needed PCB layer and the complexity of the circuit of phase detector are reduced.

According to an aspect of this invention, the detector sets are arranged in parallel rows and each detector set has one detector unit or a pair of detector units. As a result, the density of detector units is reduced to have flexible design for the electron collecting electrode, the better frequency response and higher detecting resolution.

According to an aspect of this invention, the detector units of one detector set are arranged in a pattern of equal pitch or non-equal pitch to have design flexibilities of circuit.

According to an embodiment of this invention, the phase detector includes a plurality of parallel detector rows in one PCB layer, and each row includes a plurality of detect sets, which are cyclically arranged. Each detector set includes one detector unit or a pair of detector units, which is arranged in a pattern of equal pitch or non-equal pitch. The detector units, regardless of the rows, are interleaved to have the same interval between two adjacent detector units, and the interval is defined as a pitch.

According to an embodiment of this invention, the phase is a quadruple phase detector. The quadruple phase detector includes a plurality of first and second detector units arranged in a first row and a plurality of third and fourth detector units in second row. The first and the second detector units are interleaved, and each detector unit of the first detector units is paired with a detector unit of the second detector units to form a detector pair. The third and the fourth detector units are interleaved, and each detector unit of the third detector units is paired with a detector unit of the fourth detector units to form a detector pair. The detector units of the first and the second row are interleaved to have the same interval between adjacent detector units, and the interval is defined as a pitch.

According to an embodiment of this invention, an electron collecting electrode of the detector unit is arranged beside its sensor, and its lead is connected to the electron collecting electrode. The lead is used to connect the conduct line of the PCB layer.

According to an embodiment of this invention, the detector unit is a charged-couple device (CCD) or a complementary metal-oxide-semiconductor (CMOS).

BRIEF DESCRIPTION OF THE DRAWINGS

FIG. 4A and FIG. 4B respectively illustrate the equal and non-equal configurations of detector pair in a row of the phase detector according to this invention.

FIG. 6 illustrates a triple phase detector, and the detector units are arranged in two rows in a PCB layer, and the pitch is equal to ⅓ period.

DETAILED DESCRIPTION OF THE INVENTION

A new architecture of phase detector is proposed in this document, and the following discloses embodiments according to the new phase detector in detail, accompanied with the drawings, for the skilled person in this technical field to have better understanding.

Figure 1:
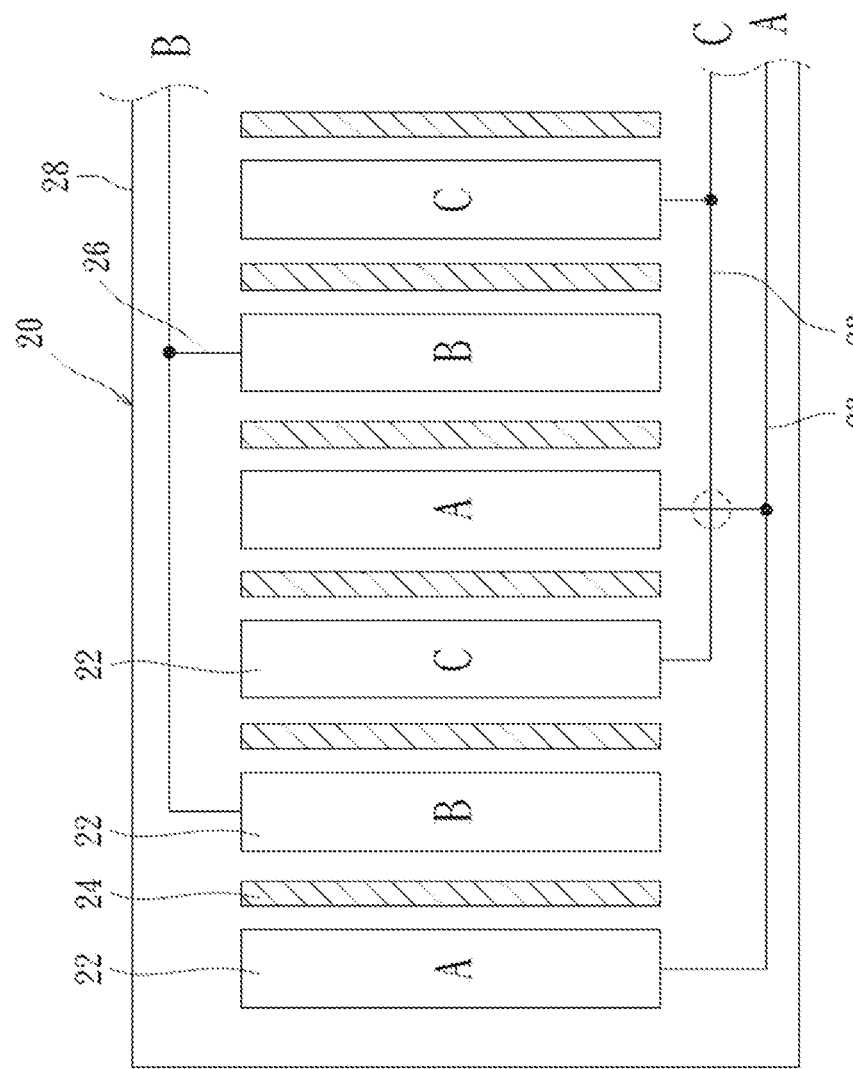
FIG. 1 illustrates a triple phase detector of a prior art.
Figure 2B:
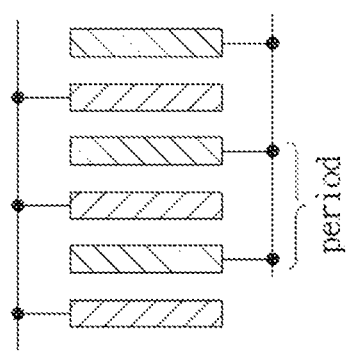
FIG. 2A, FIG. 2B and FIG. 2C respectively illustrate dual, triple and quadruple phase detector, and they have different densities of detector unit.
Figure 2A:
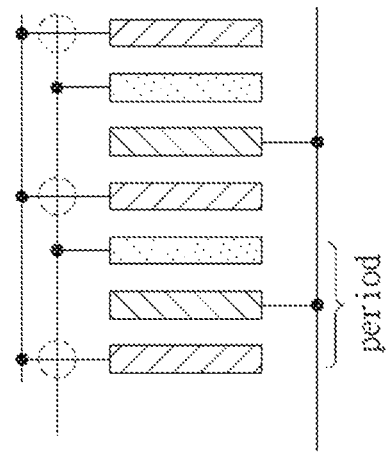
Figure 2C:
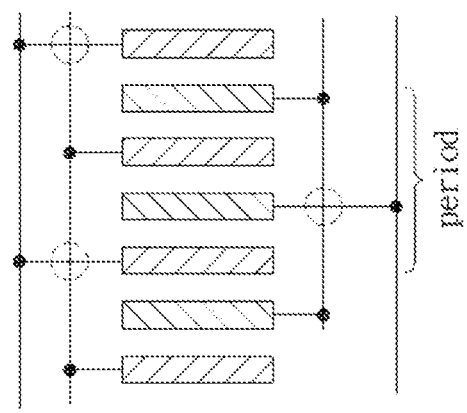
Figure 3:
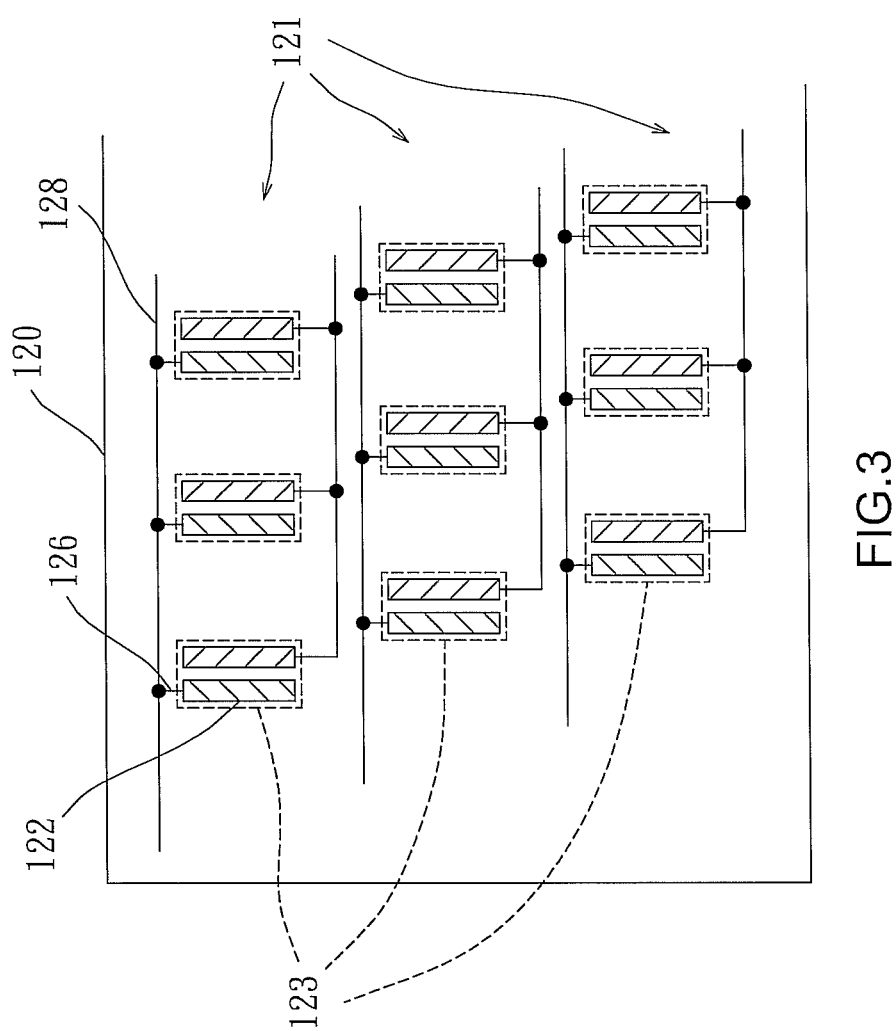
FIG. 3 illustrates the architecture of a phase detector according to the present invention.

Referring to the FIG. 3, which illustrates the new architecture of phase detector. The phase detector includes a plurality of detector rows 121 arranged on a substrate 120, like printed circuit board (PCB), in row-by-row, and each row 121 includes a plurality of detector pairs 123 (which are surrounded by a dotted rectangle), and each detector pair 123 includes two detector units 122. Each row has one top conduct line and one bottom conduct line. One of each detector unit pair is connected to the top conduct line 128 of the PCB circuit and the other to the bottom conduct line 128 through the leads 126.

The new architecture of phase detector has advantages:

(1) The difficulty of arranging the detector units so close in one line or row is reduced.

The number of detector units is obviously reduced but the density of detector unit is increased by interleaving the detector units of different rows. As a result, the interval between adjacent detector units in one row gets wider and the difficulty of arranging the detector units is reduced.

(2) The complexity of the circuit since the lead 126 is across the conduct line of the PCB circuit is reduced Each row has its own top conduct line and bottom conduct line, and one detector unit of the detector pair is connected to the top conduct line of a row and the other detector unit to the bottom conduct line of the row. As a result, the lead of the detector unit is not across the PCB circuit to reduce the complexity of the circuit.

(3) The cost is reduced by reducing the PCB layer.

Crossing the lead over the conduct line of the PCB circuit for each row and the rows are arranged in row-by-row in the same substrate, and the number of the PCB layers is reduced, so the cost is reduced.

(4) The design of configuring the electron collecting electrode of the detector unit is more flexible.

In prior arts, the electron collecting electrode is arranged on the top of the detector unit since the detector units are arranged so closer. In this invention, the interval between two adjacent detector units is large and the electron collecting electrode may also be arranged beside the detector unit. That reduces the response time of capturing the electrons, i.e. the response frequency is increased.

Regarding the configuration of detector unit pairs in a row, there are two modes, one for equal pitch and the other for non-equal pitch. Referring to the FIG. 4A and FIG. 4B, which respectively show the equal and non-equal configurations. The interval between two detector units of one pair is called an internal pitch 1231 and that between two detector units of two adjacent pairs is called an external pitch 1232. For the equal pitch configuration, the internal pitch 1231 and the external pitch 1232 are equal; and for the non-equal configuration the internal pitch 1231 and the external pitch 1232 are not equal.

Figure 5A:
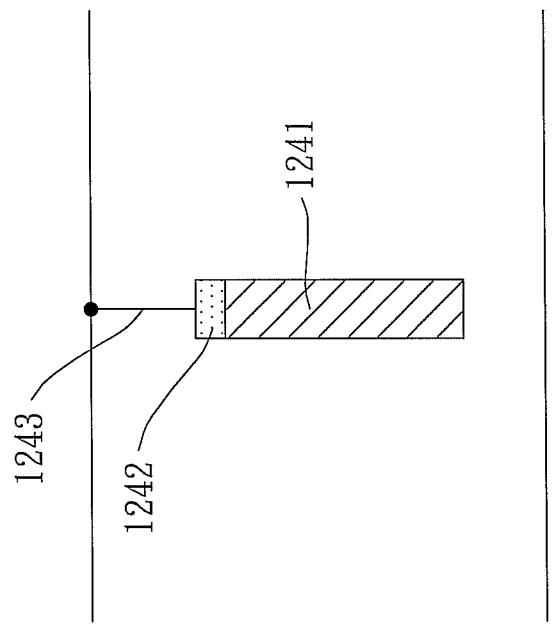
FIG. 5A and FIG. 5B respectively illustrate the structures of the detect unit, and the electron collecting electrode may be arranged beside the light sensor or on its top.
Figure 5B:
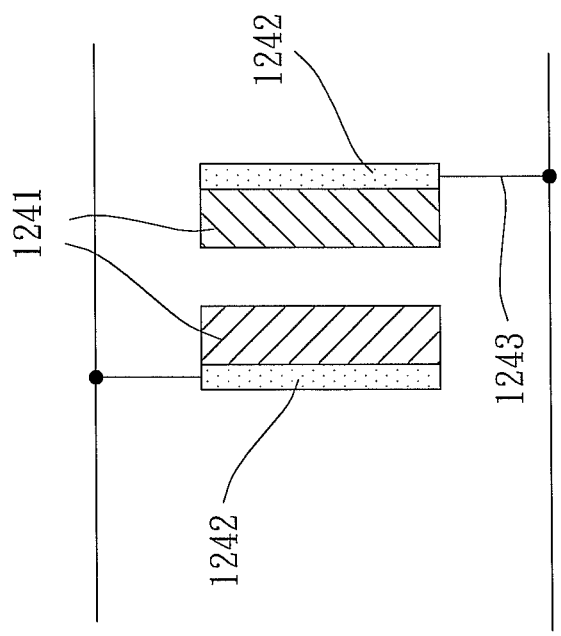

Regarding design of the detector unit referring to FIG. 5A, the detector unit includes three sub-units, which are a sensor 1241 for sensing the phase of the light intensity, an electron collecting electrode 1242 for collecting electrons and a lead 1243 for connecting to the conduct line of the PCB circuit. The incident light illuminates the sensor 1241 to excite the electrons, and those excited electrons are collected by electron collecting electrode 1242 to cause an electrical signal (voltage/current), and the signal is conducted to the conduct line of the PCB circuit. Another embodiment of the detector unit is shown as FIG. 5B. The difference between the embodiments shown as FIG. 5A and FIG. 5B is the position of the electron collecting electrode. The electron collecting electrode 1242 is arranged beside the sensor shown as FIG. 5A, and the time of capturing the excited electrons by the electron collecting electrode 1242 is shorten, i.e. the response time is shorten, so the response frequency is improved. When the electron collecting electrode 1242 is arranged on the top of the sensor 1241 as shown in FIG. 5B, because excited electrons at the bottom of the sensor 1241 will spend more time to reach the top electron collecting electrode 1242, the response time is lower, i.e. a worse response frequency. It is noted that the configuration of the embodiment shown as FIG. 5A is impossible to be implemented in conventional arts for a phase detector with a high resolution since the detector units 124 are too close, and there is no sufficient space can be reserved for the electron collecting electrode. On the contrary, it is the better design for this invention since the detector units 124 are not so close to have design flexibilities of electron collecting electrode.

The following describes some embodiments for phase detector with different resolutions. Refer to FIG. 6, which is a triple phase detector that means 3 detector units in one period. The phase detector includes two rows 151 and 152, each row includes a plurality detector sets. Each set of the row 151 includes a pair of detector units and the other only includes one detector unit. The detector units of the row 152 and the row 151 are interleaved to form a triple phase detector, and the detected phase difference between two adjacent detector units is $2\pi/3$ (120°, that is the interval between two adjacent detector units is ⅓ length of one period.

Figure 7A:
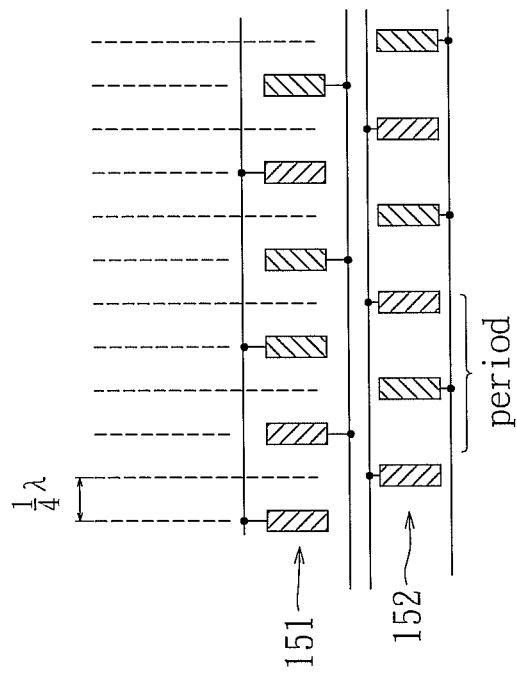
FIG. 7A and FIG. 7B illustrate quadruple phase detectors, and the detector units are arranged in two rows in a PCB layer with a non-equal and an equal configuration respectively and the pitch is equal to ¼ period.
Figure 7B:
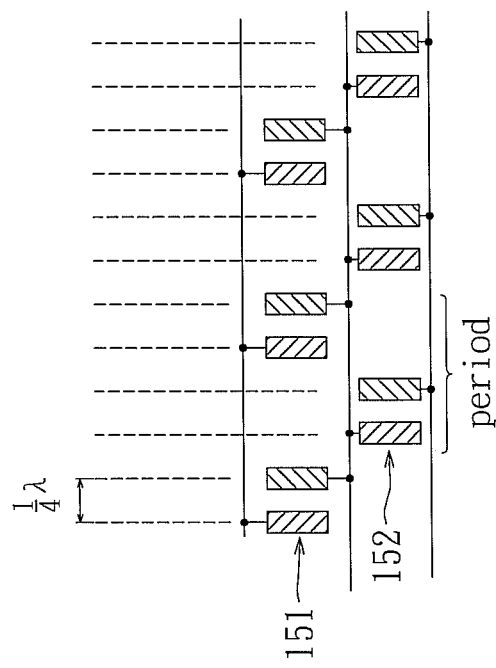

Referring to FIG. 7A and FIG. 7B, which show quadruple phase detectors with non-equal and equal pitch configurations respectively. FIG. 7A shows a non-equal pitch configuration, which includes two rows 151 and 152, and each row includes a plurality of detector sets. Each set of rows 151 and 152 respectively includes one detector unit pair with a smaller internal pitch and a larger external pitch, and the detector pairs of two rows are interleaved to form a quadruple phase detector. There are 4 phase detector units are arranged in one period, and the interval between any two adjacent detector units are equal, and the detected phase difference is $\pi/2$) (90°.

FIG. 7B shows an equal pitch configuration, which includes two rows 151 and 152, and each row includes a plurality of detector sets. Each set of rows 151 and 152 respectively include one detector unit pair. Different from the embodiment shown as FIG. 7B, the internal pitch and the external pitch of the two detector units of any pairs are equal, and the detector units of two rows are interleaved to form a quadruple phase detector. There are also 4 phase detector units with equal interval between two adjacent detect units in one period, and the detected phase difference is also $\pi/2$) (90°.

Refer to FIGS. 8A, 8B, 8C and 8D show sextuple phase detectors with different layout of the detector units. The phase detector includes 3 rows 151, 152 and 153 and each row (151/152/153) includes a plurality of detector sets, and each set includes a detector unit pair.

Figure 8A:
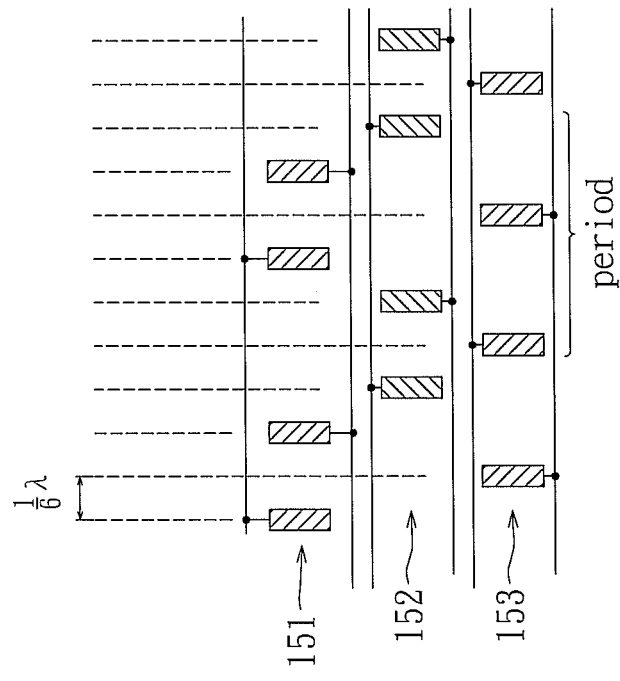
FIG. 8A, FIG. 8B, FIG. 8C and FIG. 8D show sextuple phase detectors and the detector units are arranged in three rows in a PCB layer with a non-equal, an equal and the mixture configuration respectively and the pitch is equal to ⅙ period.

Each row of the embodiment shown as FIG. 8A are configured as a non-equal pitch configuration, which has a smaller internal pitch and a larger external pitch, and the detector pairs of the 3 rows are interleaved to form the sextuple phase detector. The interval between any two adjacent detector units are equal to ⅙ length of one period, i.e. the detected phase difference is π/3(60°).

Figure 8B:
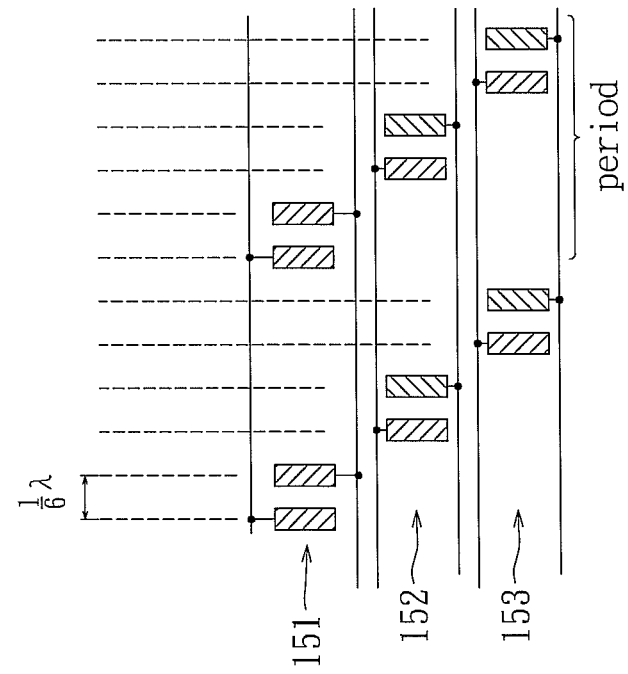
Figure 8D:
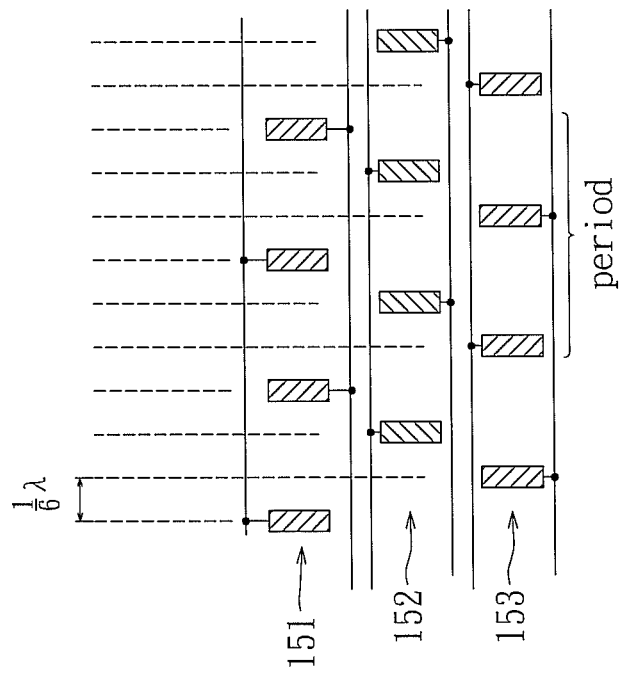
Figure 8C:
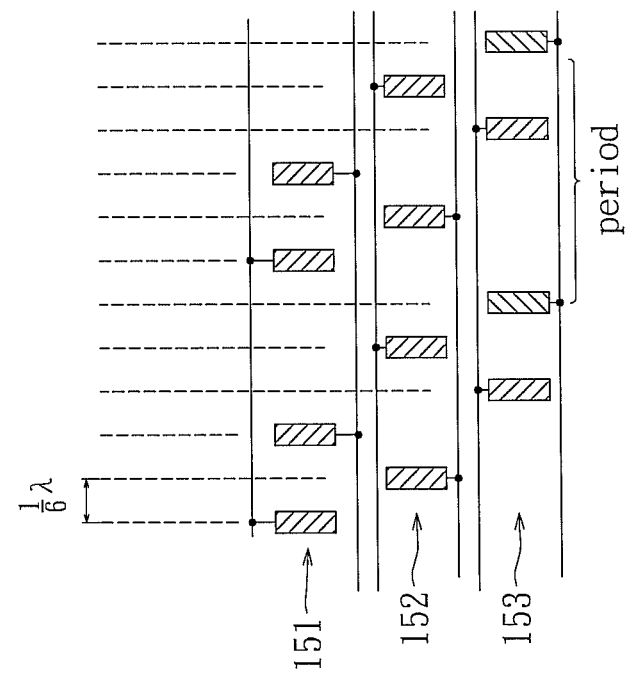

Each row of the embodiment shown as FIG. 8B and FIG. 8C are configured as a mixture of non-equal pitch and equal configuration. In the embodiment shown as FIG. 8B, rows 151 and 152 are configured as a non-equal pitch configuration and the other row 153 is configured as an equal pitch configuration. In the embodiment shown as FIG. 8C, rows 151 and 153 are non-equal pitch and row 152 is equal pitch. FIG. 8D shows an equal pitch configuration, i.e. rows 151, 152 and 153 are configured as an equal pitch configuration. Regardless of the configurations shown as FIG. 8A, FIG. 8B, FIG. 8C or FIG. 8D, the interval between any two adjacent detector units is equal to ⅙ length of one period, and the detected phase difference is π/3(60°).

Figure 9A:
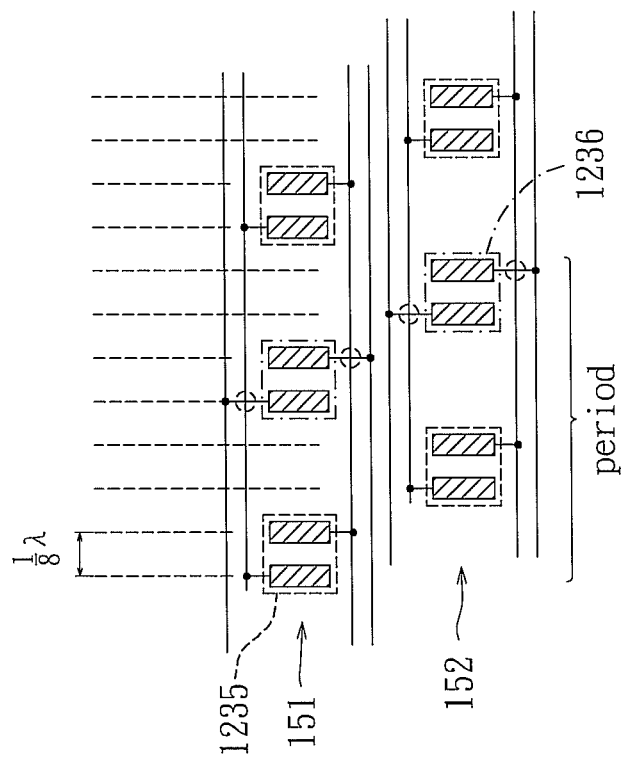
FIG. 9A and FIG. 9B show octuple phase detectors and the detector units are arranged in two rows two PCB layers with a non-equal and an equal configuration respectively.
Figure 9B:
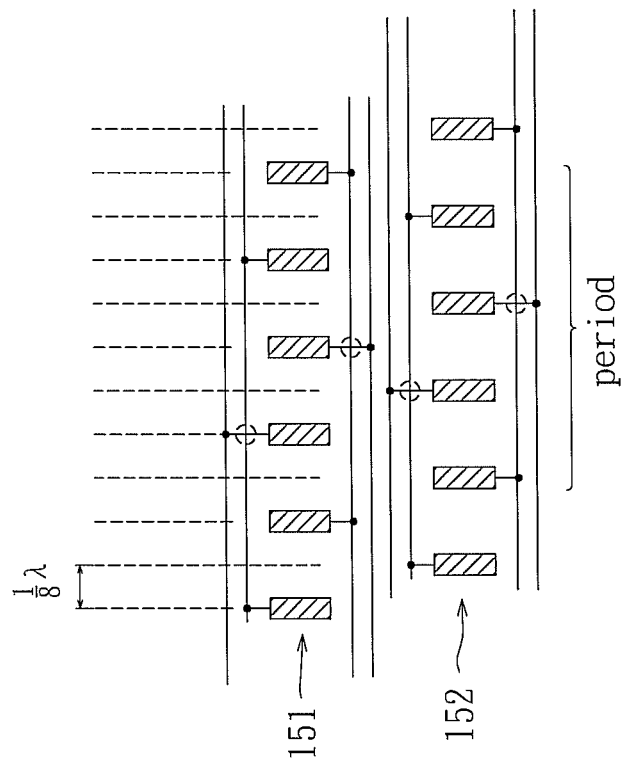

The embodiments illustrated in FIG. 6, FIG. 7A-FIG.B and FIG. 8A-FIG. 8B, there is only one detector set arranged in one period for each detector row, and all detectors, leads and conduct lines are arranged on a PCB layer. Multiple PCB layers are also used in this invention, refer to FIG. 9A and FIG. 9B, which illustrate embodiments with two PCB layers for octuple phase detectors with non-equal and equal pitch configurations respectively. Two detector rows 151 and 152 are arranged in parallel and two detector sets 1235 and 1236 are arranged in one period for each row 151 or 152. Two PCB layers are layered and the PCB circuit corresponding to one of detector sets 1235 and 1236 is lay on the lower layer. When the leads of one of the two detector sets 1235 and 1236 are across the conduct lines (marked in dotted circle), the leads have to pass through the upper PCB layer to the lower PCB layer for conduction. The detector units, regardless of the PCB layers and detector rows, are interleaved to form the octuple phase detector. The interval between two adjacent detect units, regardless of which layer, is equal to ⅛ length of one period, and the detected phase difference is π/4(45°). The embodiment shown as FIG. 9A is designed to be a non-equal pitch configuration and that shown as FIG. 9B to be an equal pitch configuration.

It is noted that the number of the PCB layers are reduced since the detector units are arranged in different rows in a PCB layer. For example, two PCB layers for triple and quadruple phase detector and three PCB layers for sextuple phase detector and four PCB layers for octuple phase detector are needed in prior arts. However, only one PCB layer is needed for double, triple, quadruple and sextuple phase detector, and only two PCB layers are needed for octuple phase detector.

The detector units, regardless of different rows and layers, are interleaved in the row direction to have the same interval between two adjacent detector units, called a pitch, which is equal to one period dividing detector unit number, which is the sum of the number of detector units in one period, regardless of the row and PCB layers. For example of the triple phase detector, two rows are arranged, and one detector set of one row includes a pair of detector units, i.e. 3 detector units in one period. The pitch is equal to ⅓ the length of one period and the detected phase difference between two adjacent detector units is 2π/3(120°). For quadruple, sextuple and octuple phase detector, the pitch are respectively equal to ¼, ⅙ and ⅛ length of one period, and the corresponding detected phase difference between two adjacent detector units are π/2 (90°, π/3(60°) and π/4(45°).

The row number and the length of the detector unit are related to the scale of phase detector. Although the length of the detector unit is shorter than that of prior arts, it is enough for detecting the phase of the incident light. Further the density of the detect unit of one row is reduced and the electron collecting electrode is arranged beside the sensor to increase the response frequency and also improves the performance of the phase detector.

The above mentioned detector unit is a light sensor, which can be implemented by a charged-couple device (CCD) or a complementary Metal-Oxide-Semiconductor (CMOS).

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A phase detector, comprising:
   a plurality of detector rows arranged row-by-row, wherein each detector row includes a plurality of detector sets arranged in one line, and at least one detector set is arranged in one period for one row, and each detector set includes a pair of detector units or one detector unit, and all detector units regardless of the same or different rows are interleaved to have an equal interval between any two adjacent detector units, and the interval is defined as a pitch, which is equal to the length of one period dividing the unit number, which is the sum of the number of the detector units in one period for all rows.

2. A phase detector of claim 1, wherein an electron collecting electrode is arranged beside each detector unit for improving the efficiency of the response frequency.

3. A phase detector of claim 1, wherein the detector unit is a charge-couple device (CCD) or a complementary metal-oxide-semiconductor (CMOS).

4. A phase detector of claim 1, wherein three detector units are arranged in one period in two rows on a PCB layer, two of the three detector units to form a pair and arranged in a set of one row and the other detector unit arranged in a set of the other row.

5. A phase detector of claim 1, wherein four detector units are arranged in one period in two rows on a PCB layer, and each row includes a pair of detector units in one set.

6. A phase detector of claim 5, wherein the detector units in a detector set are arranged in a configuration of non-equal pitch.

7. A phase detector of claim 5, wherein the detector units in a detector set are arranged in a configuration of equal pitch.

8. A phase detector of claim 1, wherein six detector units are arranged in one period in three rows on a PCB layer, and each row includes a pair of detector units.

9. A phase detector of claim 8, wherein the detector units in a detector set are arranged in a configuration of non-equal pitch for all rows.

10. A phase detector of claim 8, wherein the detector units in a detector set are arranged in a configuration of equal pitch for all rows.

11. A phase detector of claim 8, wherein the detector units in a detector set are arranged in a configuration of equal pitch for two rows and in a configuration of non-equal pitch for the other row.

12. A phase detector of claim 1, wherein eight detector units are arranged in one period in two rows and two PCB layers are layered, and two detector sets are arranged on one period in each row, and each detector set includes a detector pair, and leads of one of the two detector sets pass the upper PCB layer to the lower PCB layer.

13. A phase detector of claim 12, wherein the detector units in each detector row are arranged in a configuration of non-equal pitch.

14. A phase detector of claim 12, wherein the detector units in each detector row are arranged in a configuration of equal pitch.

15. A phase detector, comprising:
   a plurality of first detector units arranged in a first row;
   a plurality of second detector units interleaved with the plurality of first detector units in the first row;
   a plurality of third detector units arranged in a second row; and
   a plurality of fourth detector unit interleaved with the plurality of third detect units in the second row, wherein the first row and the second row are parallel with each other, wherein a distance between any two neighbor detector units from the plurality of first, second, third, and fourth detector units is the same.

16. A phase detector of claim 15, wherein an electron collecting electrode is arranged beside each detector unit for improving the efficiency of the response frequency.

17. A phase detector of claim 15, wherein the detector unit is a charge-couple device (CCD) or a complementary metal-oxide-semiconductor (CMOS).

18. A phase detector of claim 15 wherein the first and the second detector units in the first row and the third and the forth detector units in the second row are arranged in a configuration of non-equal pitch.

19. A phase detector of claim 15, wherein the first and the second detector units in the first row and the third and the forth detector units in the second row are arranged in a configuration of equal pitch.

* * * * *